(12) United States Patent
Kuo

(10) Patent No.: US 6,600,708 B1
(45) Date of Patent: Jul. 29, 2003

(54) SPEED CONTROL OF OPTICAL DISC PLAYER BASED ON DURATION OF A CONTROL SIGNAL

(75) Inventor: Yuh Wei Kuo, Taipei (TW)

(73) Assignee: Asustek Computer Inc., Taipei (TW)

( * ) Notice: Subject to any disclaimer, the term of this patent is extended or adjusted under 35 U.S.C. 154(b) by 0 days.

(21) Appl. No.: 09/498,185

(22) Filed: Feb. 4, 2000

(30) Foreign Application Priority Data

May 20, 1999 (TW) ........................................ 88108255 A

(51) Int. Cl.[7] ............................... G05B 5/00; H02P 1/18
(52) U.S. Cl. ................ 369/53.22; 369/53.3; 369/53.37; 369/47.39
(58) Field of Search ............................ 369/53.2, 53.22, 369/53.3, 53.37, 47.39

(56) References Cited

U.S. PATENT DOCUMENTS

| 4,485,337 A | * | 11/1984 | Sandusky | 318/314 |
| 4,783,774 A | * | 11/1988 | Enomoto | 369/44 |
| 4,918,743 A | * | 4/1990 | Tsuyuguchi | 388/812 |
| 5,246,479 A | * | 9/1993 | Gami et al. | 360/73.03 |
| 5,289,097 A | * | 2/1994 | Erickson et al. | 318/561 |
| 5,345,347 A | * | 9/1994 | Hopkins et al. | 360/71 |
| 5,621,288 A | * | 4/1997 | Seki et al. | 318/431 |
| 5,627,811 A | * | 5/1997 | Morita et al. | 369/50 |
| 5,841,752 A | * | 11/1998 | Ohmori et al. | 369/75.2 |

* cited by examiner

Primary Examiner—Doris H. To
Assistant Examiner—Gautam R. Patel
(74) Attorney, Agent, or Firm—Merchant & Gould, P.C.

(57) ABSTRACT

A method for controlling speed of a spindle motor of an optical disc player is provided by the invention. The method provided accept a on-line or real-time control signal asserted by a user and determine whether a property within the control signal meets a predetermined criterion. If the predetermined criterion is met, the speed of the spindle motor is set to another value. The speed change involved may be in either positive or negative direction. In the preferred embodiment, duration of the control signal is selected as the parameter while making the decision.

7 Claims, 2 Drawing Sheets

SPEED CONTROL OF OPTICAL DISC PLAYER BASED ON DURATION OF A CONTROL SIGNAL

FIELD OF INVENTION

The present invention relates to speed control of an optical disc player, and in particular, to speed control thereof through a predetermined button over the panel of the optical disc player, the player's device driver, or an input device of a computer system connected to the optical disc player.

BACKGROUND OF INVENTION

The optical disc player, i.e. CD-ROM, DVD-ROM, CD-RW, DVD-RAM, has been a basic component to a multi-media computer system.

The U.S. Pat. Nos. 4,485,337, 4,783,774, 5,289,097, 5,246,479, and 5,345,347 disclose prior arts control system relating to the optical disc player.

Nowadays the nominal operation speed of commercial optical disc player is represented by multiples of a basic unit, X. It is well known that 1 X is equal to 150 kilo bytes per second for CD-ROM definition. The key component affecting the nominal operation speed of the disc player is the spindle motor inside the disc player. In general, at the commencement of read operation of optical disc player, the disc player is set at a predetermined maximum allowable speed. As lower read rate phenomenon due to conditions, i.e. out-of-focus, eccentric or vibration of disc, the optical disc player will automatically lower its operation speed to achieve a higher read rate. In addition, for some discs having specific data format, the optical disc player will set a speed specifically corresponding to the data format of disc to achieve a maximum read rate. The well known data format types include CD-Audio disclosed by Red Book, CD-ROM Mode1, CD-ROM Mode2 disclosed by Yellow Book, CD-ROM Mode2/XA Form1, CD-ROM Mode2/XA Form2 disclosed by Green Book, Recordable Compact Disc Standard disclosed by Orange Book, etc. The types of disc data format readable to an optical disc player are stored within the firmware of the player. As the optical disc, i.e. Extended Data format, MP3, or PC-Game read by the disc player is not one of the types stored, the disc player will treat as a general data format type and reads the disc by maximum allowable speed. Under this condition, usually a software or hardware decoding approach is required in the disc player to determine and vary the speed of disc player. However, this approach is expensive and difficulty in implementation.

Due to pursue of higher operation of the disc player, noises due to wind-cutting, vibration and motor humming accompany. The noise is specially significant with respect to disc of non-standard data format running at maximum allowable speed. The noise combined with the eccentric defect associated with the optical disc may seriously jeopardize the reproduction of data, i.e. audio and video, of the disc.

SUMMARY OF INVENTION

The main objective of the invention is to provide a method and apparatus which may tune the speed of the spindle motor at a suitable speed under control of the user.

In the invention, the user may input his/her instruction through existing button over the panel of disc player, or the player's device driver, a keyboard or mouse connected to the computer system. The method provided is in real-time and on-line nature.

A method for controlling speed of a spindle motor of an optical disc player is provided by the invention. The method provided accepts a control signal asserted by a user and determines whether a property within the control signal meets a predetermined criterion. If the predetermined criterion is met, the speed of the spindle motor is set to another value. The speed change involved may be in either positive or negative direction. In the preferred embodiment, duration of the control signal is selected as the parameter while making the decision.

A speed control apparatus for a spindle motor of an optical disc player is provided by the invention. The spindle motor drives an optical disc disposed within the optical disc player. The apparatus includes a logic device and a speed control device. The logic device inputs a control signal for selectively outputting a speed control signal Va based on whether duration of the control signal meets a predetermined criterion. The speed control device is responsive to the speed control signal Va for adjusting speed of the spindle motor.

The merit and details of the invention will be further understood by the following descriptions and appended drawings.

DETAILED DESCRIPTION OF EMBODIMENT

Figure 1:
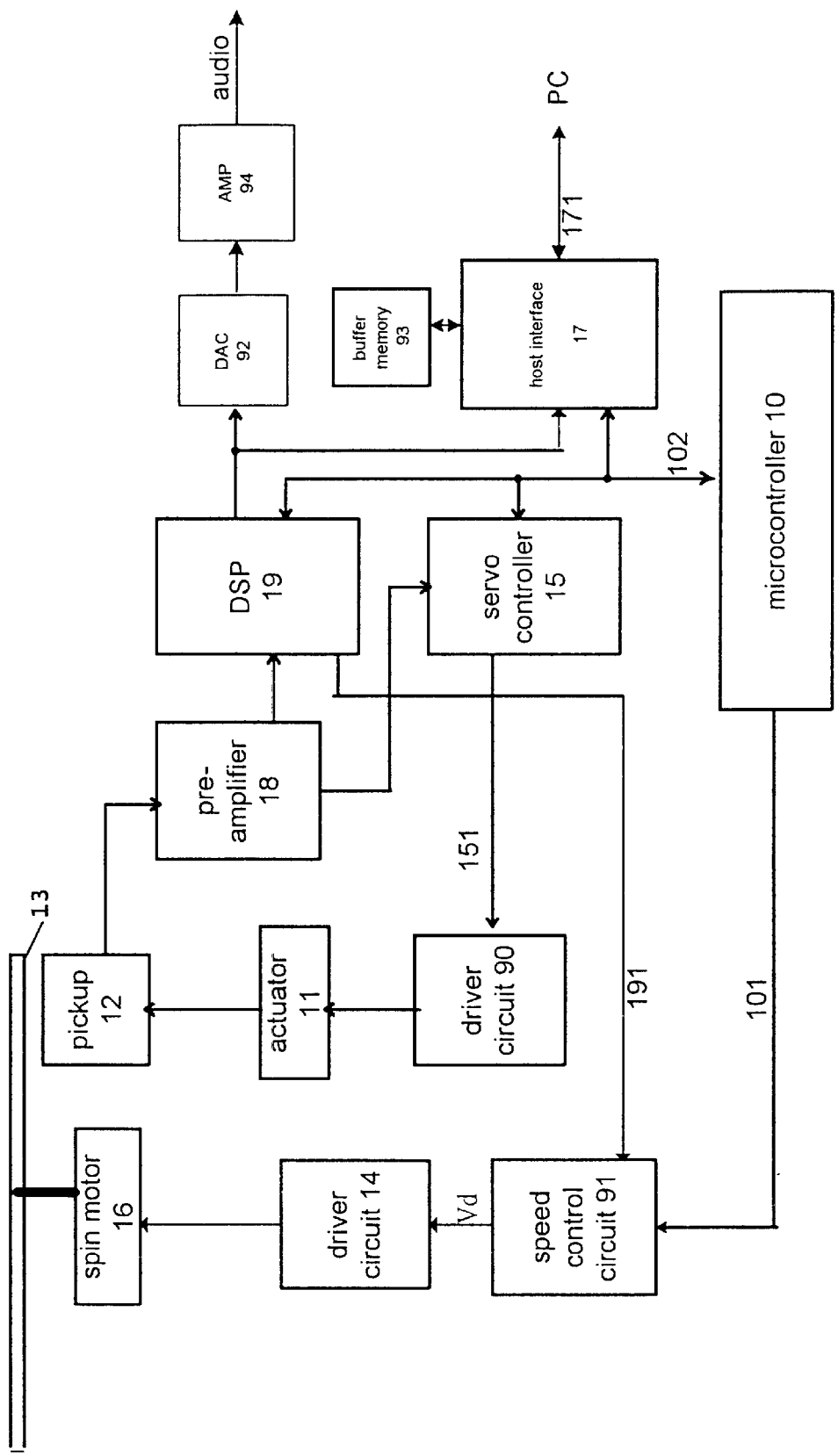
FIG. 1 shows mechanical and electrical components of a disc system in which the present invention may be employed.

Referring to FIG. 1, the mechanical and electrical components of a typical disc drive system includes a head/disc assembly (HDA) having therein an actuator 11, which preferably include a radial coil, a focus coil and an actuator motor, which positions the optical pickup 12 to different radial positions relative to the surface of disc 13. HDA also includes read preamplifier circuitry 18 for amplifying the data and servo information from the disc surface. The preamplifier circuitry 18 also contains a read buffer (not shown) for supplying read data from the particular track selected for reading. The digital signal processor (DSP) 19 receives analog read data from circuitry 18 in the HDA. As well known in the arts, DSP 19 includes a read channel analog filter which supplies the analog signal to a pulse detector (not shown). The output of pulse detector is supplied to a data separator (not shown) as raw digital read data. The disc drive control circuit further includes a servo controller section 15 for detecting and processing servo information from disc 13 relating to servo bursts, sync pulses and track ID number indicating the radial position of optical pickup 12 relative to the disc surface. The disc drive circuitry components, i.e. 15, 19, interface with a microcontroller 10 through a bus 102 which carries address, control and data information, as is well known in the art. Servo controller section 15 connects to microcontroller 10 through bus 102 and operates to control the flow of information relating to servo read timing and control. Servo controller section 15 preferably includes servo controller, analog-to-digital (A/D) converter circuitry and digital-to-analog (D/A) circuitry. The analog output 151 from servo controller section 15 is supplied as an input to the actuator driver circuitry 90. Circuitry 90 includes power amplifier control circuitry which supplies an actuator drive signal to a power amplifier which in turn supplies control current to actuator 11 in HDA. The system shown also includes spindle motor control driver circuitry 14 for controlling the spindle drive motor 16 in HDA for rotating audio-video disc 13. The disc drive also includes a host interface 17 which operates to provide control and information paths between a host computer (PC), through a bus 171 and the bus 102, and the associated elements shown. A buffer memory 93 is provided to accommodate differences in data transfer rate between the host interface 17 and host computer and that between the host interface 17 and drive. In other words, the buffer memory 93 temporarily stores the video-audio information read from the disc 13. The DSP 19 also provides a feedback signal 191 into a digital motor speed control circuit 91 which compares the feedback signal 191 with a signal line 101 from microcontroller 10. The result of comparison provides an indication of whether the motor is spinning too fast or too slow at the present time with regard to data transfer rate. The result of the comparison is used to control the driver circuit 14, which provides power to the spindle motor 16. The element 92 is a digital-analog converter (DAC) and the element 94 is an amplifier.

Figure 2:
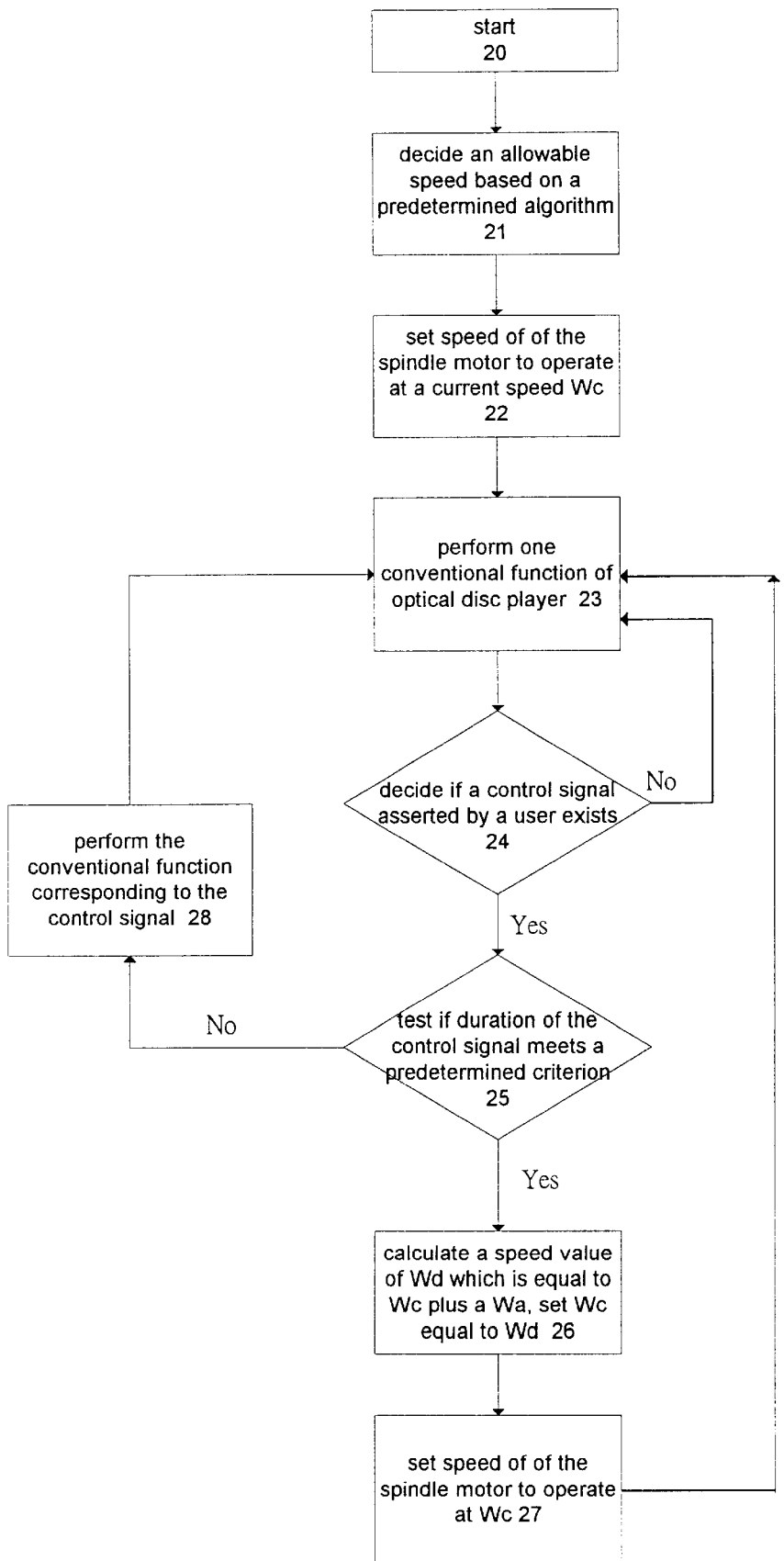
FIG. 2 shows the method of invention using flow chart methodology.

As shown in flow chart of FIG. 2, the method of invention starts in step 20. In step 21, the method decides an allowable speed based on a predetermined algorithm. For instance, the predetermined algorithm includes detecting the format type of the optical disc, the condition of out-of-focus. In step 22, the method sets speed of the spindle motor to operate at a current speed Wc which is equal to the allowable speed. In step 23, the method performs one conventional function of optical disc player under the instruction of user. During the execution of the function in step 23, the method enters the step 24 by a well known predetermined manner. In step 24, the method decides if a control signal asserted by a user exists. If No in step 24, the method goes back to step 23. If Yes in step 24, step 25 is executed. In step 25, the method tests if duration of the control signal meets a predetermined criterion. If yes in step 25, the step 26 is executed to calculate a speed value of Wd which is equal to Wc plus a Wa. Wa is a predetermined variation value. In additon, in step 26, set current speed Wc equal to Wd. Afterwards, in step 27, set speed of the spindle motor to operate at the current speed value Wc. After completion of the step 27, the flow goes back to step 23. If it is No in step 25, the step 28 is executed to perform the conventional function corresponding to the control signal.

In a preferred embodiment, the control signal is generated responsive to activation of selected button over the panel of the optical disc player. Or, alternatively, the control signal is generated responsive to activation of input device to the computer system connected to the optical disc player. The input device may be a button of a computer mouse, the disc player's device driver or a hot key on a keyboard.

In a preferred embodiment, the method of invention is a utility program executed in the microprocessor 10 shown in FIG. 1. As well known in the arts, an interrupt algorithm or a regular-based snooping algorithm may be used to enter the step 24. In another embodiment, the method may be implemented through hardware circuitry.

As mentioned above, duration of the control signal is used to determine whether the criterion is met. For instance, the predetermined criterion includes a first threshold value and a second threshold value. As duration of the control signal is smaller than the first threshold value, the disc player triggers the conventional function corresponding to the control signal. As the duration of the control signal is larger than the first threshold value and smaller than the second threshold value, the variation value Wa takes a first value. As the duration of the control signal is larger than the second threshold value, the variation value Wa takes a second value and the second value is negative of the first value. As Wa is negative, speed of spindle motor is decreased and as Wa is positive, the speed of spindle motor is increased. In one preferred embodiment, one button over the panel of the disc player may be used to generated the control signal when activated. For instance, depressed condition of play button for more than 1 second may be construed as decreasing speed of spindle motor. And, depressed condition of eject button for more than 1 second may be construed as increasing speed of spindle motor. Alternatively, additional speed-up or speed-down function may be provided in the device driver of the disc player, other than the conventional functions including play, fast-play, pause, jump-to-next-track, stop, feed-in, eject, etc. shown on the monitor screen. That is, as speed-up function in the display functions of device driver is activated, the player is set a higher speed. As speed-down function in the display functions of device driver is activated, the player is set a lower speed.

In a preferred embodiment, magnitude of Wa is a fix value of 5X. In another embodiment, magnitude of Wa may be obtained by referencing a speed table. For instance, as current speeds Wc are 40X, 30X, 20X, respectively, corresponding Wa are 5X, 4X and 3X. X has value of 150 kilo bytes per second.

As shown in FIG. 1, the apparatus provided by the invention includes a microprocessor (logic device) 10 and speed control circuit 91. The microprocessor 10 is responsive to a control signal coming through bus line 171 connected to the computer system (PC), and bus 102, and selectively outputs a speed control signal Va over the signal line 101 based on whether duration of the control signal on the bus line 171 meets a predetermined criterion. The speed control device 91 is responsive to the speed control signal Va and adjusts speed of the spindle motor 16 by sending out a drive signal Vd to the driver circuit 14.

As mentioned earlier, in a preferred embodiment, the control signal is generated responsive to the activation of selected button over the panel of the optical disc player. Or, alternatively, the control signal is generated responsive to activation of input device to the computer system connected to the optical disc player. The input device may be button of a computer mouse, a disc player device driver or a hot key on a keyboard.

As recited above, to implement the invention, only existing button on the panel of disc player can be used. This means no modification of the disc player is needed to carry out the invention. The user may easily change the speed of spindle motor at their discretion through the present invention.

What is claimed is:

1. A method for controlling speed of a spindle motor of an optical disc player, the spindle motor driving an optical disc disposed within the optical disc player, comprising the steps of:

(1) decide an allowable speed based on a predetermined algorithm;

(2) set speed of the spindle motor to operate at a current speed Wc which is equal to said allowable speed;

(3) accept a control signal;

(4) test if duration of the control signal meet a predetermined criterion, wherein the predetermined criterion includes a first threshold value and a second threshold value;

(5) if YES in step (4), calculate a speed value of Wd, Wd being equal to Wc plus a Wa, Wa being a predetermined variation value, and, afterwards, set speed of the spindle motor to operate at the speed of value Wd, wherein the variation value Wa takes a first value when the duration of the control signal is larger than the first threshold value and smaller than the second threshold value, and the variation value Wa takes a second value which is negative of the first value when the duration of the control signal is larger than the second threshold value;

(6) if NO in step (4), maintain speed of the spindle motor.

2. The method of claim 1, wherein the control signal is indicative of assertion of an eject button of the optical disc player.

3. A method for controlling speed of a spindle motor of an optical disc player, the spindle motor driving an optical disc disposed within the optical disc player, comprising the steps of:

(1) decide an allowable speed based on a predetermined algorithm;

(2) set speed of the spindle motor to operate at a current speed Wc which is equal to said allowable speed;

(3) accept a control signal;

(4) check if format of the optical disc match one of a plurality of formats within a pre-stored reference table;

(5) if YES in step (4), maintain speed of the spindle motor;

(6) if No in step (4), test if duration of the control signal meet a predetermined criterion;

(7) if YES in step (6), calculate a speed value of Wd, Wd being equal to Wc plus a Wa, Wa being a predetermined variation value, and, afterwards, set speed of the spindle motor to operate at the speed value of Wd;

(8) if No in step (6), maintain speed of the spindle motor.

4. The method of claim 3, wherein the predetermined criterion includes a first threshold value and a second threshold value, as the duration of the control signal is larger than the first threshold value and smaller than the second threshold value, the variation value Wa takes a first value, as the duration of the control signal is larger than the second threshold value, the variation value Wa takes a second value, the second value being negative of the first value.

5. The method of claim 3, wherein the control signal is indicative of assertion of an eject button of the optical disc player.

6. A speed control apparatus for a spindle motor of an optical disc player, the spindle motor driving an optical disc disposed within the optical disc player, comprising:

logic means, inputting a control signal, for selectively outputting a speed control signal Va based on whether duration of the control signal meets a predetermined criterion, wherein the predetermined criterion includes a first threshold value and a second threshold value;

speed control means, responsive to the speed control signal Va, for adjusting speed of the spindle motor, wherein the speed of the spindle motor is added a predetermined variation value Wa, wherein the variation value Wa takes a first value when the duration of the control signal is larger than the first threshold value and smaller than the second threshold value, and the variation value Wa takes a second value which is negative of the first value when the duration of the control signal is larger than the second threshold value.

7. The apparatus of claim 6, wherein the control signal is indicative of assertion of an eject button of the optical disc player.

* * * * *